United States Patent [19]
Lokhoff

[11] Patent Number: 5,592,497
[45] Date of Patent: Jan. 7, 1997

[54] MULTITRACK RECORD CARRIER HAVING DIGITAL DATA REVERSIBLY STORED THEREON AS ERROR PROTECTED PRODUCT CODEWORDS

[75] Inventor: Gerardus C. P. Lokhoff, Eindhoven, Netherlands

[73] Assignee: U.S. Philips Corporation, New York, N.Y.

[21] Appl. No.: 419,483

[22] Filed: Apr. 10, 1995

Related U.S. Application Data

[62] Division of Ser. No. 197,070, Feb. 15, 1994, Pat. No. 5,467,360, which is a continuation of Ser. No. 814,944, Dec. 30, 1991, abandoned, which is a continuation of Ser. No. 491,371, Mar. 9, 1990, abandoned.

[30] Foreign Application Priority Data

Jan. 18, 1990 [EP] European Pat. Off. ............. 90200128

[51] Int. Cl.⁶ ............................................. G06F 11/00
[52] U.S. Cl. ........................ 371/37.4; 371/37.5; 371/2.1; 395/182.04
[58] Field of Search ................... 371/37.4, 37.5, 371/30, 38.1, 39.1, 37.7, 2.1; 369/275.2; 360/22, 47, 48, 27

[56] References Cited

U.S. PATENT DOCUMENTS

| | | | |
|---|---|---|---|
| 3,643,063 | 2/1972 | Marsh et al. | 235/434 |
| 3,836,891 | 9/1974 | McDaniel | 364/474.01 |
| 4,121,191 | 10/1978 | Corkhill | 367/74 |
| 4,742,519 | 5/1988 | Abe et al. | 371/38.1 |
| 5,467,360 | 11/1995 | Lokhoff | 371/37.4 |

*Primary Examiner*—Robert W. Beausoliel, Jr.
*Assistant Examiner*—Ly V. Hua
*Attorney, Agent, or Firm*—Leroy Eason

[57] ABSTRACT

Digital data is encoded in accordance with an error protection product code into C1 codewords and C2 codewords, and the codewords are stored on a plurality of parallel recording tracks of a record carrier. The code symbols of any particular C1 codeword are assigned to a segment of a single storage track. The number of code symbols in a C2 codeword are a multiple of the number of tracks, and are cyclically assigned to segments of all tracks and cross intersegment boundaries, the physical spacing between adjoining symbols of a C2 codeword being substantially uniform in both coordinate directions. The storage requirements of the coding apparatus are reduced if the number of symbols in each C2 codeword is an integral multiple of the number of tracks. The positions on the tracks of the symbols of any codeword have a 1:1 correspondence with the addresses of such symbols in the RAM for both the encoder and the decoder.

8 Claims, 5 Drawing Sheets

TABLE 1 d = u mod 2048
e = u div 2048

(d = 0 ... 2047    e = 0 ... 3)  => t = (((( d div 8 ) mod 13 ) + 1 ) * 5
    - ((( d div 8 ) mod 13 ) div 6 ) * 30
    + ((( d div 8 ) mod 13 ) div 12 ) * 30 )
    mod 8 b = ( d mod 8 ) + ( e * 8 )

i = ( d div 104 ) * 2
    + ( 1 - 2 * ( e mod 2 )) *
    ((( d div 8 ) mod 13 ) div 6
    - (( d div 8 ) mod 13 ) div 12 )
    + ( e mod 2 )

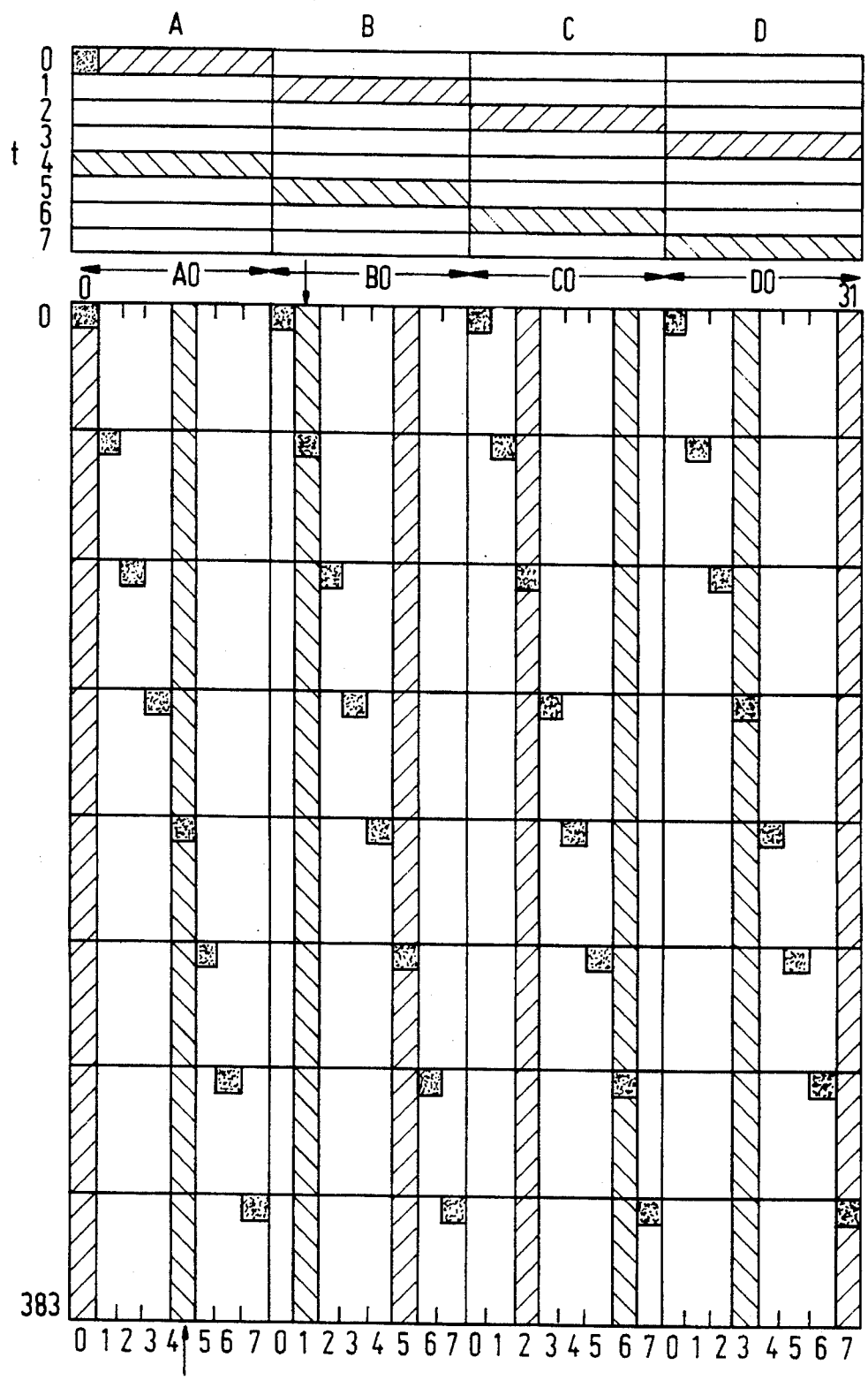

MULTITRACK RECORD CARRIER HAVING DIGITAL DATA REVERSIBLY STORED THEREON AS ERROR PROTECTED PRODUCT CODEWORDS

RELATED APPLICATIONS

This application is a division of now allowed application Ser. No. 08/197,020, filed Feb. 15, 1994, now U.S. Pat. No. 5,467,360, which is a continuation of application Ser. No. 07/814,944, filed Dec. 30, 1991, now abandoned, which is a continuation of application Ser. No. 07/491/371, filed Mar. 9, 1990, now abandoned; all of which are applications of the present inventor and assigned to the present assignee.

BACKGROUND OF THE INVENTION

1. Field of the Invention

The invention relates to a multitrack record carrier having digital data reversibly stored thereon as error protected product codewords. In particular, the record carrier may be a magnetic cassette tape having a plurality of parallel recording tracks. Alternatively, the "tracks" could be successive revolutions of what is effectively a spiral on a disk, such as an optical recording disk.

2. Related Art

Storage of digital data on record carrier tracks is notoriously sensitive to mutilation, which may result in alteration of any arbitrary bit or of long strings of bits along a particular track, particularly bit strings which have patterns having a high error probability. BCH codes over finite fields have proven to be advantageous for error protection, in particular Reed-Solomon codes defined for multi-symbol words, each symbol being an 8-bit element of a finite Galois field, the codes being cyclic at the symbol level. The ordinary-skilled technician could, however, omit various of these code characteristics without deviating from the basic concept of the invention.

Background information concerning digital audio tape recording and error protection of the recorded digital data can be found in various publications; for example, "Principles of Digital Audio" by K. C. Pohlmann, 2d ed. 1989, H. Sams & Co., and "Error Control Coding" by S. Lin et al, 1983, Prentice-Hall, Inc.

SUMMARY OF THE INVENTION

The invention provides for storing digital data with a degree of error protection consistent with a reasonable complexity of encoding and decoding, and realizing such protection in a regular data format. According to one of its aspects, the invention provides for storing digital data on a storage medium having a plurality of substantially uniform data storage tracks, employing an error protection encoding operation utilizing a first symbol correcting code which defines first code words (C1 code words) and a second symbol correcting code which defines second code words (C2 code words), the first and second symbol correcting codes together constituting a product code. First encoding means uses the first code to generate error protected C1 code words, the symbols in each C1 code word being assigned to a particular single track, and second encoding means uses the second code to generate error protected C2 code words, the symbols of which are cyclically distributed among all of the plurality of tracks. Each C2 code word has a number of symbols that exceeds said plurality of tracks. The number of symbols in a C2 codeword is preferably an integral multiple (>1) of the multiplicity of tracks, since that enables systematic operation of the apparatus. However, in the case of a truncated code word it can be provided with fiduciary zeros or other indicia to obtain the requisite numbers of symbols, and such fiduciary indicia need not be stored. The symbols in any C2 code word are physically disposed so that the spacing between physically neighboring symbols thereof on the storage medium is substantially uniform and has non-zero components both along the tracks and across the tracks.

The storage format so attained provides protection against possible row errors that could afflict a large fraction of the data on any single track, and against column errors that could afflict a plurality of code symbols that in principle are written simultaneously, if tape skew is ignored. Furthermore, protection against drop-out patches of the recording medium is also realized.

Advantageously, among said non-zero components the cross-track component derives from a uniform across track jump between successive symbols of a C2 code word which is an integral number of tracks modulo said plurality, said integral number also being prime relative to said plurality. This allows for easy address calculations.

Advantageously, among said non-zero components the along-track component results from a uniform-along-track component of the jump between successive symbols of said C2 code word. This further simplifies address calculation.

Write means may be provided for magnetically writing in parallel tracks on a magnetic tape record carrier. If high quality magnetic tape is employed that will allow for high-density data storage and high-rate transfer. However, standard tape can be employed if the bit wavelength is kept sufficiently long.

Preferably, the write means interface to a plurality of tracks which are mutually adjoining. This simplifies relative positioning of the write means and further raises attainable storage density.

Preferably, the plurality of tracks is disposed on half the width of said tape, the outer edge track being filled with parity symbols that respectively pertain to respective associated C2 code words. Outer tracks are slightly more susceptible to mutilation, and so in consequence of storage of code words only on inner tracks the overall susceptibility to error is diminished.

Preferably, each track has a sequence of data storage blocks, each block containing a uniform integral number of C1 code words, said integral number being 2, and within any block the symbols of the two C1 code words are interleaved. This improves the uniformity of the code word storage organization.

Preferably, ignoring tape skew, the physical disposition of C1 words among the plurality of tracks is mutually synchronous. This lowers requirements for buffering in the recording apparatus.

Preferably, again ignoring tape skew, the physical disposing of said blocks among the plurality of tracks is mutually synchronous, and on each track a plurality of blocks is contained in a tape segment of uniform size. A plurality of tape segments is contained in a tape frame of uniform size, the tape segments and tape frames being mutually synchronous among the plurality of tracks, and each C2 code word is fully contained in a single tape frame. This further raises the uniformity of storage organization.

Preferably, mutually synchronous blocks among all tracks constitute a slice, and the symbols of each C2 code word are uniformly distributed over all slices of a frame.

This further improves uniformity of storage organization.

Preferably, there is provided a RAM encoding memory accommodating storage of data for recording on a plurality of tape segments, to wit an input RAM segment for therein receiving user data for an intended tape segment; a series of RAM segments for therein storing user data of a corresponding series of intended tape segments, which data is stored as associated C1 and C2 code words; and an output RAM segment for outputting the code words for recording as a fully encoded tape segment. Whereas the C2 code words may be distributed over a plurality of RAM segments and the C1 code words over a single segment, the total storage capacity required is only two RAM segments more than the number covered by the distribution of the C2 code words.

Preferably, the number of said plurality of tracks is equal to 8. This is a good trade-off between high transfer rate and moderate apparatus complexity.

Preferably, the C1 code is a (24, 20, 5) code and the C2 code is a (32, 26, 7) code, the last numeral in each case being the code distance. These codes, in particular as combined in a product code, provide immunity against a wide range of errors. Nevertheless, the mathematical complexity of executing correction and/or detection of errors remains simple. In particular, odd-distance codes were found to team up better than even-distance codes, even if the codes have rather different distances.

Preferably, each frame comprises 384 C2 code words. This achieves balance between simple organization and large storage capacity of the RAM.

Preferably, the non-zero displacement component across the tracks derives from a jump of +5 modulo said plurality of tracks. This allows for simple address processing.

Preferably, the storage medium is a reversible storage medium. In addition to magnetics, also state of the art optical storage media can be employed.

The invention also relates to transmission apparatus for interfacing to an intended storage medium and provided with encoding means for executing an encoding operation and transmitting means fed by the encoding means for transmitting product code words by means of broadcast and/or physical guidance means.

In particular, the invention could be used in cases where the data store is separate from the encoder, for example, controlled by a different entity at the receiving end of a broadcast link. The combination of encoding and storing would then together comprise the storage device, the encoding being performed as if the storage device were effectively present at the encoder. Transmission can be by radio, cable, optical or other means.

Preferably, such apparatus would comprise reception means for an analog audio signal and analog to digital conversion means fed by said reception means for providing at least a substantial part of the digital data for subsequent encoding using the product code. Direct audio to coded-data conversion provides an effective counter-measure to interface by external disturbances.

The invention also relates to decoding apparatus for use with one or more of those recited supra or for emulating the storage medium, comprising access means for accessing said real or emulated storage medium, internal storage means for accommodating all data contained within a set of C1 code words and within a set of C2 code words, said sets together constituting a smallest product code block, first decoding means for decoding the C1 code words in said set thereof, and second decoding means for thereafter decoding the C2 code words in said set thereof. The second decoding means includes accessing means which, for decoding any particular single C2 code word, accesses said storage means at addresses corresponding to physical on-medium positions that have substantially uniform distances between neighboring, recorded symbols in such code word, any such distance having non-zero components both along the tracks and across the tracks. The storage means may be physically united with the decoding device or could be present at the encoding device. The sequence would then be: encoding-storing-broadcasting or otherwise transmitting. The same advantages would be obtained with any of such organizational arrangements.

The invention also relates to apparatus for reading and decoding such digital data, the decoding more or less mirroring the procedure followed at encoding. Advantageously, such read apparatus comprises a multisegment RAM memory and means for sequentially filling a predetermined plurality of RAM segments with data from said real or emulated storage medium, wherein any C1 code word is entirely assigned to one single RAM segment and any C2 code word is entirely assigned to one single multisegment RAM frame, the symbols of a C2 code word running with a uniform row jump and a uniform column jump through such RAM frame modulo the dimensions of said RAM frame. This results in a relatively low required storage capacity.

Advantageously, each segment of the multisegment RAM memory accommodates a uniform number of C1 code words which are uniformly distributed among the tracks of a single segment of said plurality of tracks, so that any track segment fits 1:1 on a RAM segment. Upon filling of a RAM segment, decode means directly activates decoding of any C1 code word in such segment. Fast activation of the decoding diminishes the time lag between reading and reproducing of stored information.

Advantageously, storage of the C2 code words crosses intra-memory segment boundaries of a first plurality of segments up to a further plurality of segments but no other intra-memory segment boundaries, said apparatus having second decoding means which, after storing of said C2 code words in said first plurality of memory segments and decoding by said first decode means, activates decoding of said C2 code words. Such time lag, by means of this stratagem, is kept low as well.

Advantageously, said memory accommodates, in addition to said further plurality of memory segments, an input segment for inputting data of one storage medium segment and an output segment for outputting data of one already decoded storage medium segment. For example, a four-segment frame would then only require a six-segment memory. The above advantages clearly have their counterparts in the storage device mentioned earlier.

The invention also relates to an information reproducing device and containing a decoding device as recited supra, comprising holding/driving means for said storage medium in the form of a magnetic tape, head means for time-sequentially accessing a stretch of locations on said tape, and audio reproduction means fed by said decoding device. Such device would constitute a price-effective consumer entertainment apparatus for general use. In particular, the decoder part thereof could well be contained in a single-chip.

The invention also relates to a unitary storage medium in the form of a magnetic tape for use with a decoding device as described above, and comprising said plurality of substantially uniform storage tracks, said tracks comprising a storage frame which is equally distributed over said parallel tracks, the tracks being disposed on one half of said magnetic tape. The storage frame is protected by a symbol-correcting block product code as represented by C1 words and C2 words, each C1 word being disposed within exactly one of said tracks, each C2 word being disposed over all of said tracks, each C2 word having a number of symbols that is an exact multiple of the number of tracks, the physical spacing among neighboring symbols of the C2 word being substantially uniform and having non-zero components both along said tracks and across aid tracks.

The invention also relates to magnetic tape storage medium as described which is contained in a cassette that interfaces to the described apparatus. Such cassette would still further improve the physical integrity of data storage.

BRIEF DESCRIPTION OF THE DRAWINGS

The invention will be explained in detail hereinafter, with respect to a preferred embodiment that is shown in the appended Figures. In particular, first the data format and associated decoding and encoding procedures are explained. Thereafter the error protection code format will be discussed in detail. Now, in the Figures:

FIG. 4 shows the mapping of data stored on the tracks of a vacant carrier;

FIG. 5 shows the data mapping in the RAM;

DESCRIPTION OF PREFERRED EMBODIMENTS

Figure 1:
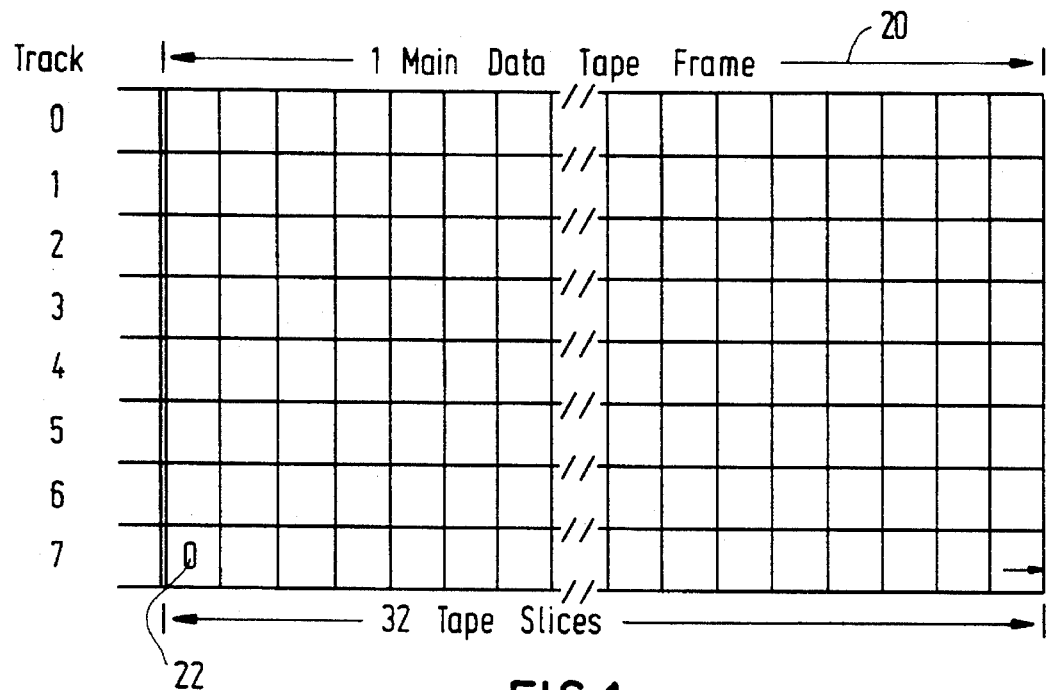
FIG. 1 shows a main data tape frame format according to the invention.

FIG. 1 exemplifies the main data allocation in a tape frame, that is, user data plus associated error correction redundancy data. Further, in this respect, FIG. 8 formalizes the mapping of user data onto the tape. The user bytes (or symbols) are numbered sequentially. Their internal organization is not considered; they could, however, derive from digitized single channel or double-channel audio, video, or other data source. Each byte D has three indexes t, b, i, namely track number t [0 to 7], tape block number b [0 to 31], and symbol number i within a block [0 to 47]. The number of user main data bytes in a tape frame is 8192. The placement of these bytes according to their placement number u [0 to 8191] is found with the formulae of FIG. 8. Use is also made of two intermediate variables d, e, wherein e in effect is a segment number and d the number of a slice within the segment in question. In addition 128 system information symbols may be accommodated to give a total of 8320 non-redundant symbols within the product code block. The RAM, to be discussed hereinafter, has 32 columns (corresponding to 8 tracks in each of 4 track segments) and 384 rows (corresponding to 8 data blocks per track in each track segment, and 48 symbols per data block), and so accommodates 12288 symbols. The number of redundant symbols is thus 12288−8320=3968 symbols. This number is lower than the sum of the redundant symbols of each of the C1 code words and C2 code words because several redundant symbols are part of two code words. This in fact results from the principle of a product code.

Now, as shown in FIG. 1, for storage on tape eight tracks 0 . . . 7 are provided. The data, inclusive of redundant error-protection data, is carried in units called tape frames. Each tape frame, indicated by arrow 20, covers all eight tracks. Each tape frame is divided into 32 consecutive tape slices shown as columns. Each tape slice contains 8 tape blocks, one tape block for each track. Also, a tape frame is divided into four frame segments that each contain 8 consecutive slices of the tape frame in question. These frame segments have not been indicated in the Figure. One tape block 22 corresponds to 408 unmodulated main data bits, that in actual practice are modulated to form 510 channel bits. For brevity, however, the modulating into channel bits has not been detailed further and the description hereinafter only applies to the unmodulated bits. On the tape, corresponding tape blocks of different tracks are aligned as shown. Each tape block consists of a sync-pattern of 10 bits, a number-indication symbol of 8 unmodulated bits and a parity symbol of 8 unmodulated bits, which leaves space for 48 code symbols. The subsequent consideration relates to the latter 48 symbols per block, $48 \times 32 \times 8 = 3 \times 2^{12} = 12288$ symbols per frame. The code used will be discussed hereinafter.

(1) Product Decoder Apparatus

Figure 2A:
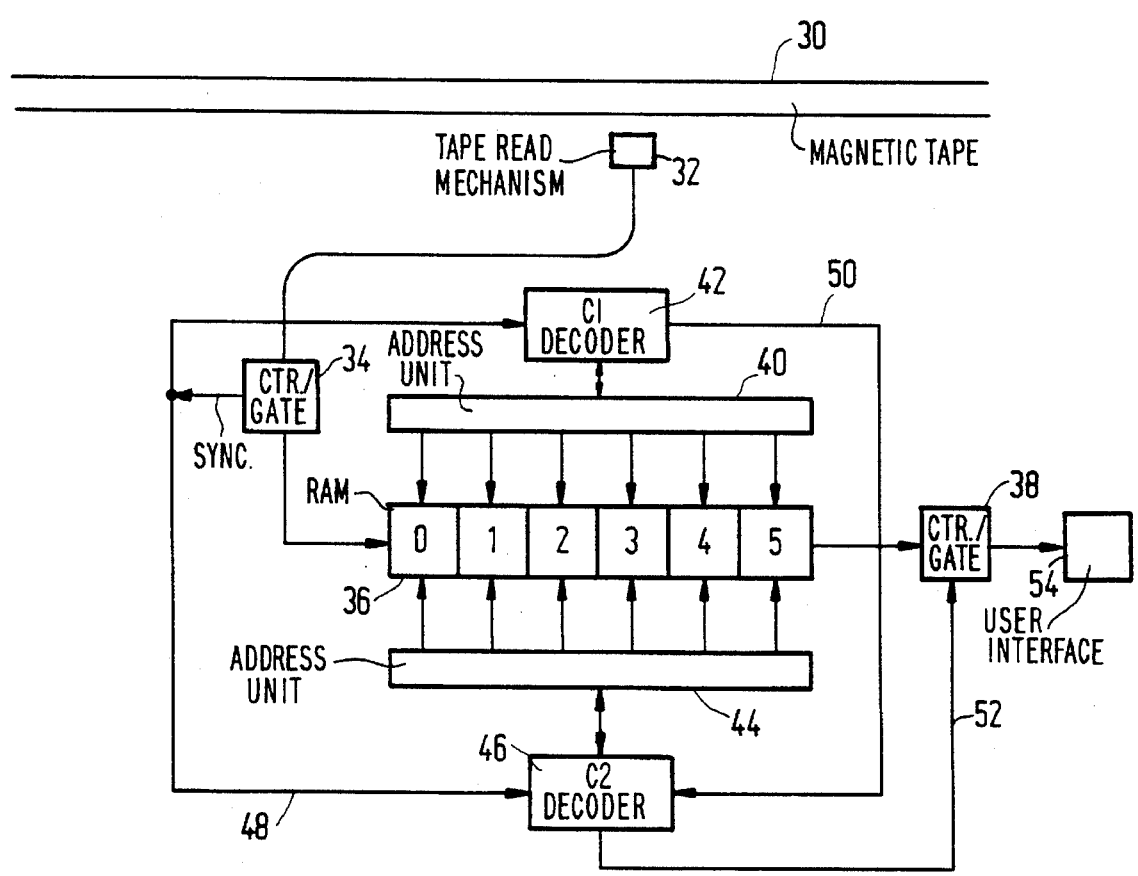
FIG. 2a is a block diagram of a product decoder according to the invention.
Figures 3, 8:
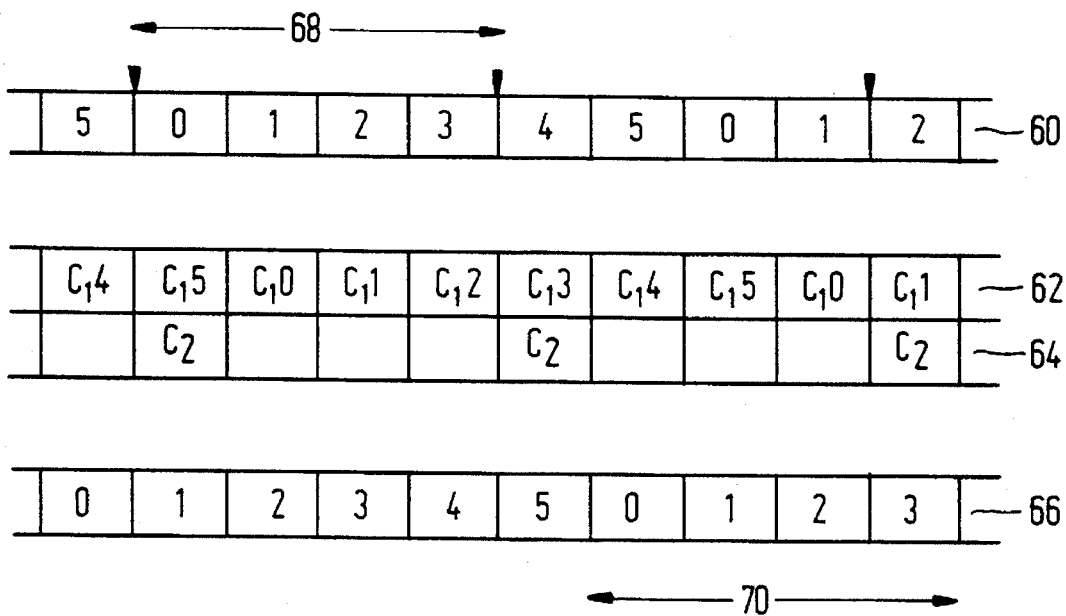
FIG. 3 schematically shows RAM segment accessing in the RAM storage device of FIGS. 2a and 2b.
FIG. 8 formalizes the mapping of user data on the tape.

FIG. 2a is a block diagram of a product decoder apparatus embodiment. The tape 30 is read simultaneously in eight parallel tracks by a tape read mechanism 32. In actual practice, a demodulator would also be necessary to execute channel bit demodulating. Block 34 is a counter/gate driven by a synchronization mechanism, not shown, and counts off the bytes, segments, and frames. RAM 36 comprises six RAM segments, or pages, that are numbered 0–5. It is gated by counter/gate 34, which provides write addresses by successive incrementation and also gates the data read from the tracks to RAM 36. Another counter/gate 38 gates data read out from RAM 36 to a user output interface 54 and provides read addresses by successive incrementation. In this way RAM 36 is a first-in-first-out buffer with respect to the tape data. As symbolically shown, block 42 is a C1 codeword decoder that bidirectionally accesses RAM 36 via an address unit 40. Likewise, block 46 is a C2 codeword decoder that bidirectionally accesses RAM 36 via its own address unit 44. In this respect, FIG. 3 schematically shows the segment-wise accessing of RAM 36 by write counter/gate 34. Inasmuch as time goes from left to right in the Figure, all six RAM-pages are filled or overwritten in cyclical sequence. The physical disposition of the segments in the RAM structure is of no consequence to the decoding organization. In FIG. 3, row 62 shows the decoding operation by C1 decoder 42. Decoder 42 receives a synchronizing signal from counter/gate mechanism 34 on line 48, and in consequence, knows the instant at which a complete segment has been stored in RAM 36 and also its address (range). Now inasmuch as each C1 code word of 24 symbols (bytes) is completely contained within one tape segment and each tape segment is one-to-one mapped on a single RAM segment, the C1 decoding can be effected directly on the most recently received tape segment. As shown in row 62, this leads to a cyclical sequence that is delayed by one segment interval with respect to row 60. Furthermore, inasmuch as each C2 code word of 32 symbols is completely contained within one tape frame of four tape segments and each tape frame by means of the segment mapping is one-to-one mapped on four consecutive RAM segments, the C2 decoding can be effected directly on the four segments after the last thereof has been received, provided that the C1 decoder has finished its operation (regardless of whether the correction has been successful or not). In row 60, the small arrows indicate the frame boundaries. As shown on row 64, the C2 decoding is effected during a single segment interval following the complete reception of the frame in question. As shown in FIG. 2(a), C2 decoder 46 is also synchronized by counter/gate 34 via line 48, and moreover, receives a "ready" signal from C1 decoder 42 on line 50. When the C2 decoder has finished its operation, line 52 may carry a "free" signal to output counter/gate 38. Alternatively, the latter may be unconditionally synchronized via a signal line 48. Row 66 in FIG. 3 shows that completion of the operation of C2 decoder 46 is followed by read access on the four consecutive RAM segments that had been decoded during the most recent operation of C2 decoder 46. Thus, the four tape segments received during interval 68 are outputted during interval 70. In consequence the whole arrangement of FIG. 2a functions as an error correction FIFO with an incurred delay of five tape segment intervals. It is clear that six RAM segments are necessary and sufficient for the storage. If the C2 decoding were to take more time, for example two or three tape segment intervals, the storage requirements would amount to seven or eight RAM segments, respectively. In FIG. 2a RAM 36 has a four-port facility. Inasmuch as decoders 42, 46 function alternatively, their respective operations may be mapped on a single hardware facility that is suitably programmed. Moreover, inasmuch as writing into RAM 36 by counter/gate element 34, reading by counter/gate element 38 and decoding by decoders 42, 46 never take place on the same RAM segment, on a segment level RAM 36 may be limited to a one-port facility. In the case of a truncated C2 codeword decoding could be commenced somewhat earlier, the end of such word being indicated by an external signal.

The arrangement described above may comprise a reset functionality, not shown, which is activated for example upon recognition of correct accessing of the first frame. This may be signalled by the first frame start encountered after block headers have begun to show up correctly. Furthermore, as described infra, the C1 code words are confined to one respective block only. In consequence this could be used to achieve a slight further acceleration in that C1 decoding would start directly after receiving the associated block. Estimation of the cost of such operation has revealed that the additional cost of such a more complicated control arrangement would in some cases outweigh the additional benefits.

(2) Product Encoder Apparatus

Figure 2B:
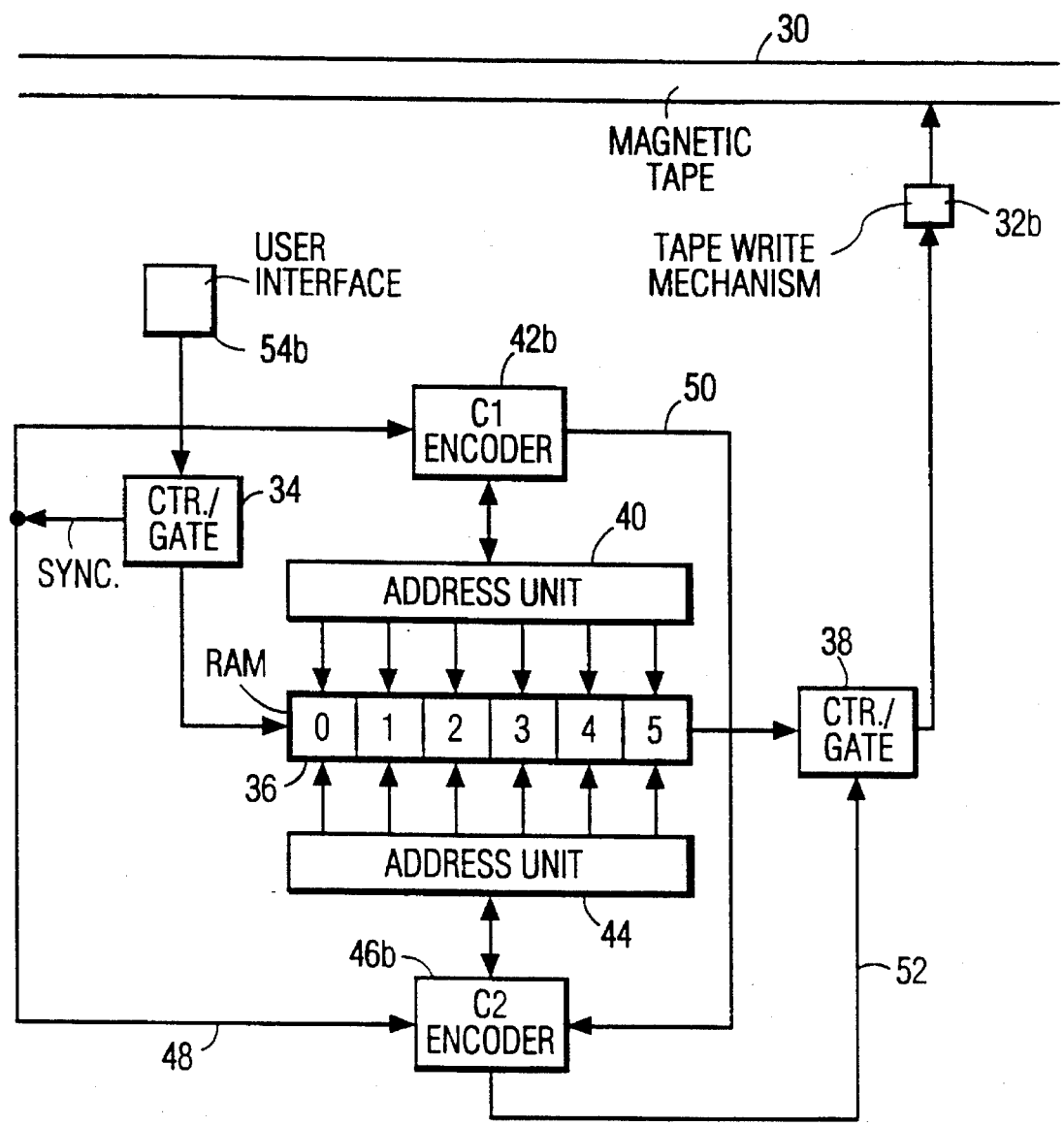
FIG. 2b is a block diagram of a corresponding product encoder.

The arrangement of FIG. 2a has been described as relating to decoding of data read from tape and which is to be presented to a user output interface 54. A very similar arrangement, as shown in FIG. 2b, could be used for product encoding, wherein the C1 code word encoding is segment-wise effected by C1 encoder 42, after which frame-wise C2 code word encoding is effected by C2 encoder 46. The product encoding arrangement in FIG. 2b is very similar to the product decoding arrangement in FIG. 2a, the changes being replacement of tape read mechanism 32 by the user input interface 54b, and replacement of output interface 54 by the tape write mechanism 32b. Corresponding elements in FIGS. 2a and 2b have the same reference numerals, but with a "b" suffix in FIG. 2b. Of course, in FIG. 2b the elements 42b and 46b are codeword encoders rather than codeword decoders as in FIG. 2a. However, the operation and construction of such circuits is the same, whether employed for coding or decoding.

Alternatively, the encoding arrangement in FIG. 2a could be modified to also enable such arrangement to be used as a decoder. For example, in FIG. 2a the tape read mechanism 32 can be read/record mechanism, and interface 54 can be bidirectional. The input to the RAM would then include a multiplexer so that it is either fed by read/record mechanism 32 or by interface 54. Also, the output of the RAM would include a demultiplexer to either interface 54 or mechanism 32. As another possible modification, since generation of error correction redundancy symbols is somewhat simpler than decoding, the codeword encoder 42b, 46b could be simplified. For example, no feed-back operation is necessary in an encoder, whereas in a decoder an unexpected outcome, such as an uncorrectable error in a C2 word, would necessitate additional measures to be taken.

The combined symbol correcting codes yield a product code system. This means that the time sequence of C1 encoding and C2 encoding is irrelevant. After the user data of a complete segment has been stored in the RAM, either the redundancy symbols of the C1 code words can be calculated first, or, alternatively, first the redundancy symbols of the C2 code words. Conceptually, the user data of a product code can be visualized as a matrix wherein the redundancy consists of three parts:

a. redundant symbols along the rows b. redundant symbols along the columns c. doubly redundant symbols along the redundant columns, which are identical to the doubly redundant symbols along the redundant rows.

Further considerations as to reading also apply to the writing of the code words.

For simplicity, various well known electromechanical features have not been described, such as the holding/driving of the tape, feed-back looping with velocity, and read/record head construction. Details of the RAM addressing will be described below.

(3) Error Protection Code Format

FIG. 4 shows the data mapping on the tape, in particular one frame with its four tape segments A . . . D, each tape segment having respective equal-sized fractions thereof disposed on each of eight tracks 0 . . . 7. Within each tape segment, two respective tracks have been shown hatched to show that the data is recorded in such a way that on each track the date of a portion of only one segment of a data frame is recorded.

FIG. 5 shows the mapping of the data in such tape frame into four RAM segments A0, B0, C0, D0, the total content of any tape segment being mapped exclusively on the like-indicated RAM segment, such as A-to-A0. The two remaining RAM segments, according to FIGS. 2a, 2b and 3, may left out of consideration with respect to the tape frame in question, because they do not contribute to the product code of the frame now under consideration. It should be noted that whereas the vertical scale in FIG. 4 (track numbers) corresponds to the horizontal scale in FIG. 5 (memory columns within each respective RAM segment as shown at the lower edge), the horizontal scale of each tape segment of FIG. 4 has been expanded vertically in FIG. 5 for better clarity, as represented by the larger area of FIG. 5 as compared to that of FIG. 4. The representation in FIG. 5 has been chosen to illustrate a logical structure of the storage arrangement. In practice, physical constraints, in particular, available address ranges, may lead to a physical setup that is different, but which may be attained by an elementary address transposition. Each of the hatched track segments of FIG. 4 is mapped to a column of the corresponding RAM segment in FIG. 5, as shown by corresponding orientation of the hatching. The RAM as shown has 32 columns 0 ... 31 and 384 (=8×48) rows (0 ... 383), each location so defined accommodating one symbol. As shown, the mapping is one to one, the column number of the RAM segment being equal to (t*5) mod 8. The column number in the complete RAM is then found by adding 8 times the segment number, which for RAM segments A0, B0, C0, D0 is 0, 1, 2, 3, respectively. Always, t is the track number. For example, for t=5 in tape segment B, the column number in RAM segment BO is (5×5)mod8=1, as shown by an arrow. The mapping in the other direction is the same inasmuch as track 1 is mapped on column 5, within RAM segment B0.

Second, the disposition of the C1 code words in the RAM is considered. Now, each block, of 408 unmodulated bits, has two (2) C1 code words of 24 symbols each (and three other symbols, not relevant here). The symbols of the two code words are interleaved in that odd-numbered symbols belong to one code word and even-numbered symbols belong to the other. This also applies to the eight redundant symbols within each block, which are the last symbols of the block (right hand end in FIG. 1) on the tape. In consequence, in RAM they fill the lowest eight rows of each set of 48 rows.

Third, the disposition of a C2 code word in RAM is considered. FIG. 5 shows one particular code word that starts with the symbol at row 0, column 0. Thereafter, the row jump is 48 and the column jump is one. In consequence, each next symbol relates to a different track. Further, each next symbol jumps by one block in the forward direction of the tape track. The cross track jump is plus (+) five tracks mudulo 8 (without carry or borrow). For the one code word in question, all symbols have been highlighted in FIG. 5 as dark squares. Transposition to other code words is effected by shifting all symbols over a uniform number of rows (with rotation between the upper and lower edges) and/or over a second uniform number of columns (with rotation between the left and right edges).

Figure 6:
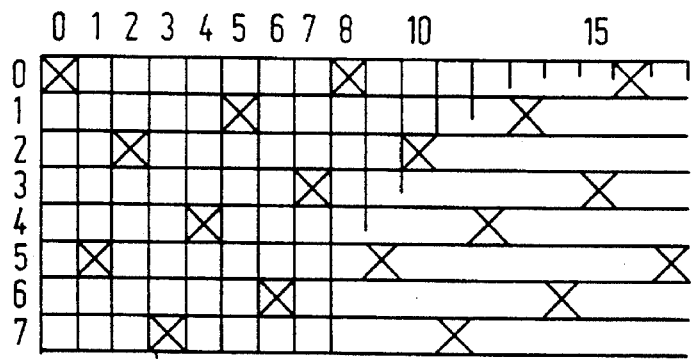
FIGS. 6, 6A show the disposition of the symbols of a C2 word on the tracks of a record carrier.

In this respect, FIG. 6 shows the disposition of the first 18 symbols of the C2 code word highlighted in FIG. 5, each cross now representing one symbol of the block of 48 symbols in question. Each next symbol now is in a next tape block column, and shifted over five tape tracks (mod 8) without carry or borrow. For simplicity, the position of the respective symbols within their associated blocks has not been shown. As clearly visible, on a block basis the physical distance between neighboring code symbols is substantially uniform.

Figure 6A:
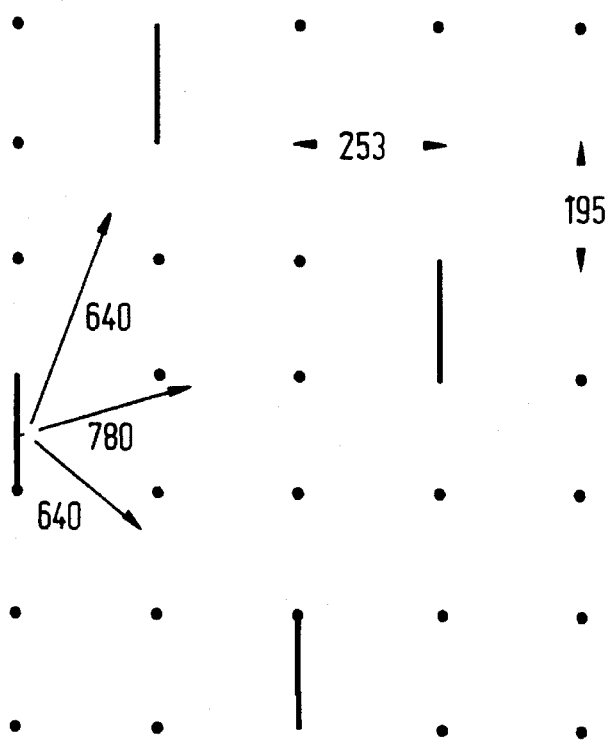

In a typical embodiment, envisaged tape speed is 4.76 cms/sec at a bit rate of 96 kilobits per second. This results in a bit length of 0.495 micron. Track pitch is intended as 195 microns, which means that in such longitudinal recording the bit area is substantially shorter than wide. Each tape block has 510 channel bits, resulting in a block length of 253 microns, which means that the area covered by a block is 253×195 microns and so can be considered approximately square. Thus the uniform distances in FIG. 6 would effectively translate to a substantially uniform distance between respective neighboring code symbols of a C2 code word. In this respect, FIG. 6A shows the center-to-center distances between neighboring symbols of a C2 code word in the three possible relative dispositions. The symbols are shown as vertical bars within their blocks, of which only the corners have been indicated by dots. The relative center-to-center distances of 640, 780 microns relate as 1:1.22. Other relationships, such as up to 1:1.3 or even up to 1:1.4, could also be considered as yielding a substantially uniform distance between nearest neighbors. The Figure takes into account that the code symbols within their respective blocks have identical positions. The uniform distance results in a good robustness of the codewords against error due to scratches and other burst-type errors. In effect the C2 code, having a distance of 7, at six redundant symbols (n,k=32, 26) may correct up to six erasure symbols per word. This applies in case that the C1 codewords have provided pointers to all mutilated symbols of the codeword in question. In that case a circle in FIG. 6 encompassing such six symbols, and assuming 100% erasure thereof, would not cause breakdown of the error correction capability. In FIG. 6 this would correspond to a width of six blocks on a row, which is only 1,5 millimeter, which is considered tolerable for almost every purpose. Even in case the lay-out were to be changed to disk-type storage, the same advantageous properties are realizable provided that the ratio of the diameter of the outer track to that of the inner track of the tracks in a frame is substantially equal to one. In practice, a ratio of 1—1 or even somewhat more would be readily acceptable.

As a further measure to increase error resistance of the code format, track number 0 is filled completely with the redundant symbols of the C2 code; in the highlighted code word of FIG. 5, this refers to the code symbols (4) in the top row of the RAM memory, having symbol numbers 0, 8, 16, 24. The same applies to all other C2 code words inasmuch as the first symbol thereof is always assigned to the leftmost segment column. Furthermore, the other parity symbols have the following rank: for even-numbered C2 code words (0, 2 ... 382) they are positioned at symbols 7, 23; and for odd-numbered C2 codewords (1, 3 ... 383) they are positioned at symbols 15, 31. This means that all those other redundant symbols are mapped on track 3, which is now 50% covered with parity symbols.

The advantage of filling track 0 completely with redundant symbols can be seen as follows. The set of eight tracks discussed earlier, about 1.2 millimeters wide, covers one half the width of ⅛" tape. For reverse use, a second set of tracks is provided in the same format on the other half width of the tape. Now, both tracks 0 run at the outer edges of the recording track proper and thus, generally are somewhat more exposed to mutilating interference, tape wear, etcetera. Now in case the outer track be the only one mutilated, the remaining data integrity would be upheld, as signalled by correct performance of the C2 code, whereas the C1 code would signal irreparability for the outer track.

Figure 7:
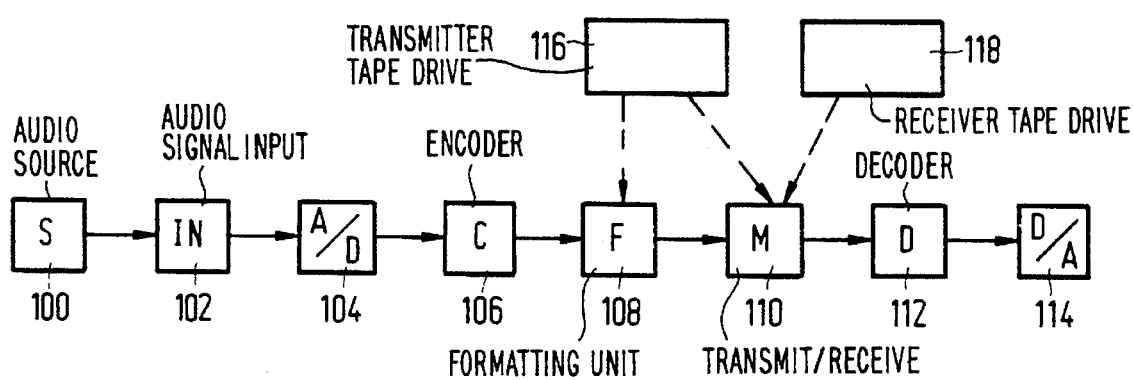
FIG. 7 illustrates a transmission system using the present invention.

FIG. 7 illustrates a complete system for use of the present invention in its various embodiments. Block 100 is a source for analog audio signals. This may be, for example in audio record player, a loudspeaker, or a naturally occurring audio source such as an orchestra. Block 102 represents an audio input to the system, such as a microphone or wire connection, plus its associated audio amplification, filtering, etc. Block 104 represents the analog to digital conversion of audio samples received from element 102. Block 106 represents encoding as referred to earlier, complete with digital processing provisions and an encoding RAM. Block 108 represents a formatting unit for the encoded data, thereby generating the data segments for recording on a tape. These segments can be outputted in various different ways, such as parallel 8-bit bytes. Alternatively, such parallel 8-bit bytes may be serialized to single bit width for broadcast, cable or optical wave guide transmission. Block 110 represents the broadcast transmitter, broadcast medium and broadcast receiver combined. Alternatively, such elements may be adapted for cable or wave-guide use. Further alternatively, block 110 may comprise a magnetic head for writing and reading, respectively, for storage on a digital audio tape or disc. The audio tape or disc may be housed in a cassette of suitable box-like or envelope-like dimensions, shaped according to protective needs, storage requirements, accessibility and commercial promotivity. If required, read head(s) and write head(s) may be integrated or even combined into a single head or head set. Block 112 represents the decoder device together with its decoding RAM. Block 114 represents an output unit, comprising D/A conversion, de-interleaving, amplification and loudspeaker insofar as required. Block 116 represents a driving mechanism at the transmitter of the encoded data, for example as a tape drive. Block 118 represents a similar driving mechanism at the receiver of the encoded data. In certain commercial applications, such as a reversible recorder, the driving mechanisms could be integrated as a single driving mechanism. For brevity, various constructional and organization details have been omitted. It should be noted that the transmitter operates as if the receiver were actually present, and as such emulates the presence of the receiver; i.e., it operates as if the receiver were present. Likewise, the receiver operates as if the transmitter were present.

What is claimed is:

1. A magnetic tape record carrier having a plurality of substantially parallel coextensive recording tracks constituting a succession of tape frames in the tape direction, each tape frame including a predetermined number of successive tape segments each of which includes a segment of all of the tracks, each tape segment having a corresponding segment of a frame of data recorded thereon; each data segment including first codewords (C1) and second codewords (C2) of respective error correcting codes which together constitute a product block code, each codeword including data symbols and parity symbols in accordance with the relevant error correcting code, the symbols of any particular C1 codeword all being on a single track in a single tape segment and the symbols of any particular C2 codeword being distributed among a plurality of tracks in a plurality of the segments of a tape frame; the number of symbols in a C2 codeword being an integral multiple of the number of tracks and being distributed thereon so that the geometric spacing between adjoining symbols of said C2 codeword is substantially uniform and has non-zero components both along and across said tracks.

2. A magnetic tape record carrier as claimed in claim 1, wherein each data frame is recorded as a uniform number of blocks of data on each of said tracks, corresponding blocks on all tracks constituting successive tape slices which, independently of tape skew, are in synchronism; the symbols in each C2 codeword being dispersed on the tracks so that successive symbols thereof are separated by an along-track jump of one slice and a cross-track jump of a uniform number of tracks modulo said plurality (N) of tracks.

3. A magnetic tape record carrier as claimed in claim 2, wherein said blocks occupy substantially square areas on said tracks.

4. A magnetic tape record carrier as claimed in claim 2, wherein the number of symbols in each C2 codeword is equal to the number of blocks on each tape within a data frame.

5. A magnetic tape record carrier as claimed in claim 4, wherein each of said blocks includes the same number of C1 codewords.

6. A magnetic tape record carrier as claimed in claim 5, wherein two C1 codewords are stored in each data block, the symbols of such codewords being interleaved.

7. A magnetic tape record carrier as claimed in claim 1, wherein the tape is in a cassette adapted to interface with apparatus for reading or recording data on said tape.

8. A record carrier as claimed in claim 1, having a recording layer of magnetic material in which said tracks are formed, said tracks being re-recordable by recording of new data over data already recorded thereon.

* * * * *